(No Model.) 2 Sheets—Sheet 1.
J. KENNEDY.
FASTENING DEVICE FOR CAR WHEEL TIRES.
No. 400,089. Patented Mar. 26, 1889.
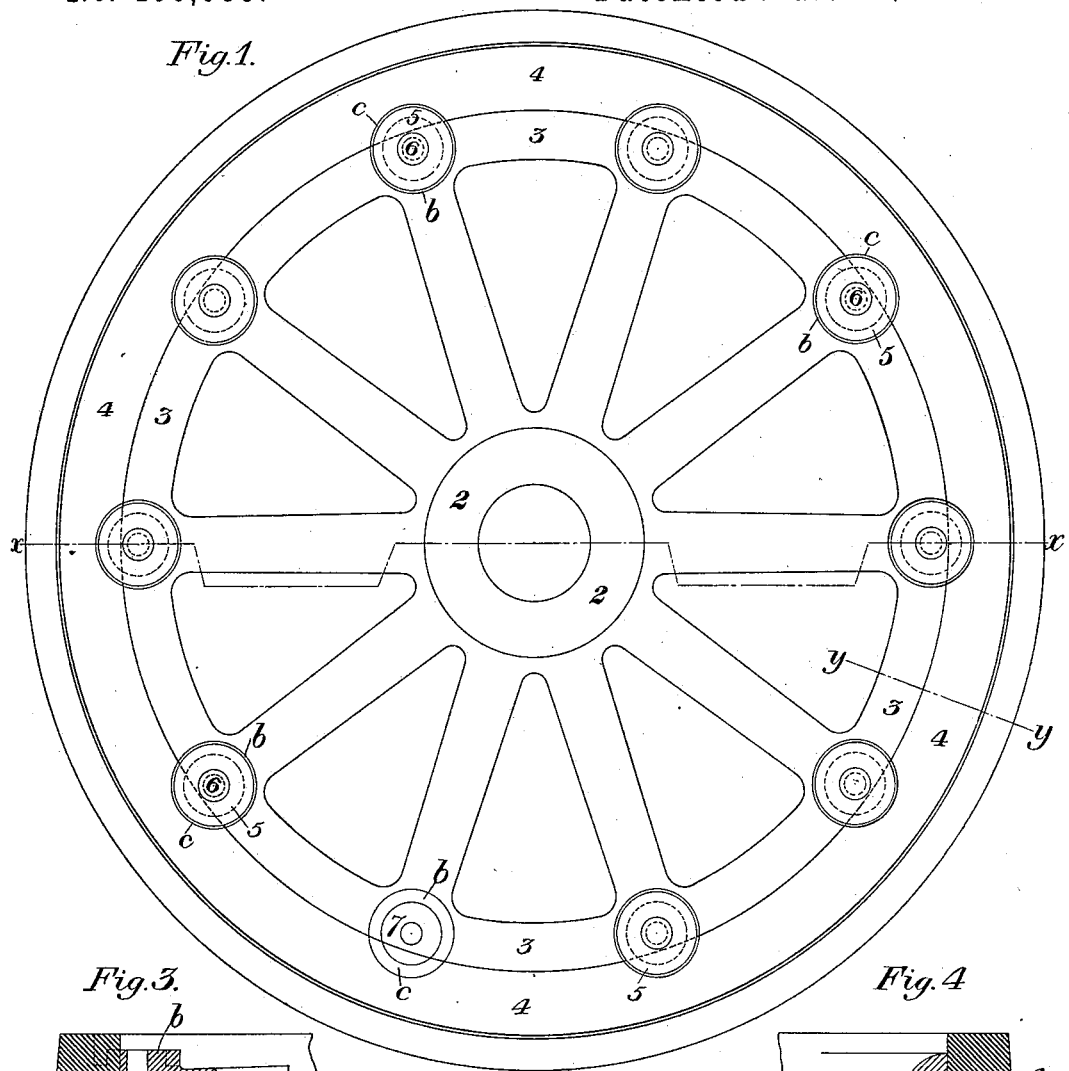
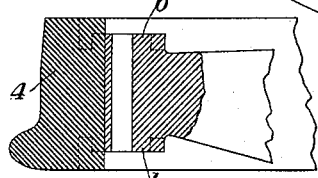
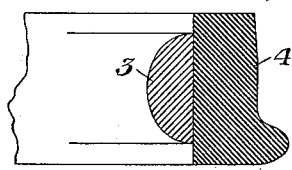
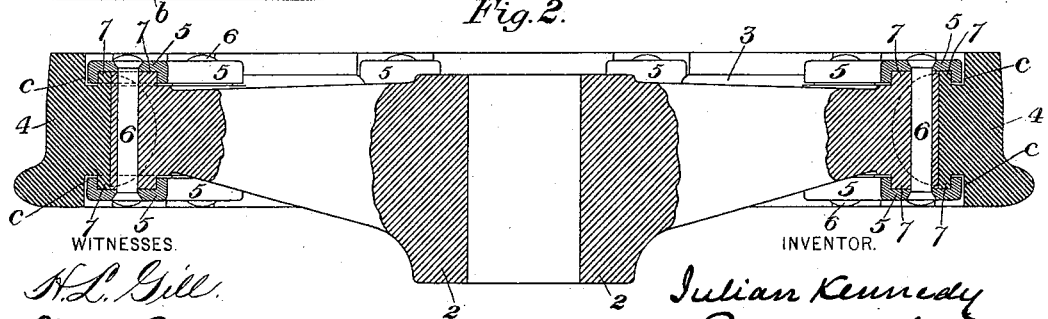
WITNESSES. INVENTOR.
H. L. Gill
N. B. Corwin
Julian Kennedy
by W. Bakewell & Sons
his attorneys.

(No Model.) 2 Sheets—Sheet 2.
J. KENNEDY.
FASTENING DEVICE FOR CAR WHEEL TIRES.
No. 400,089. Patented Mar. 26, 1889.
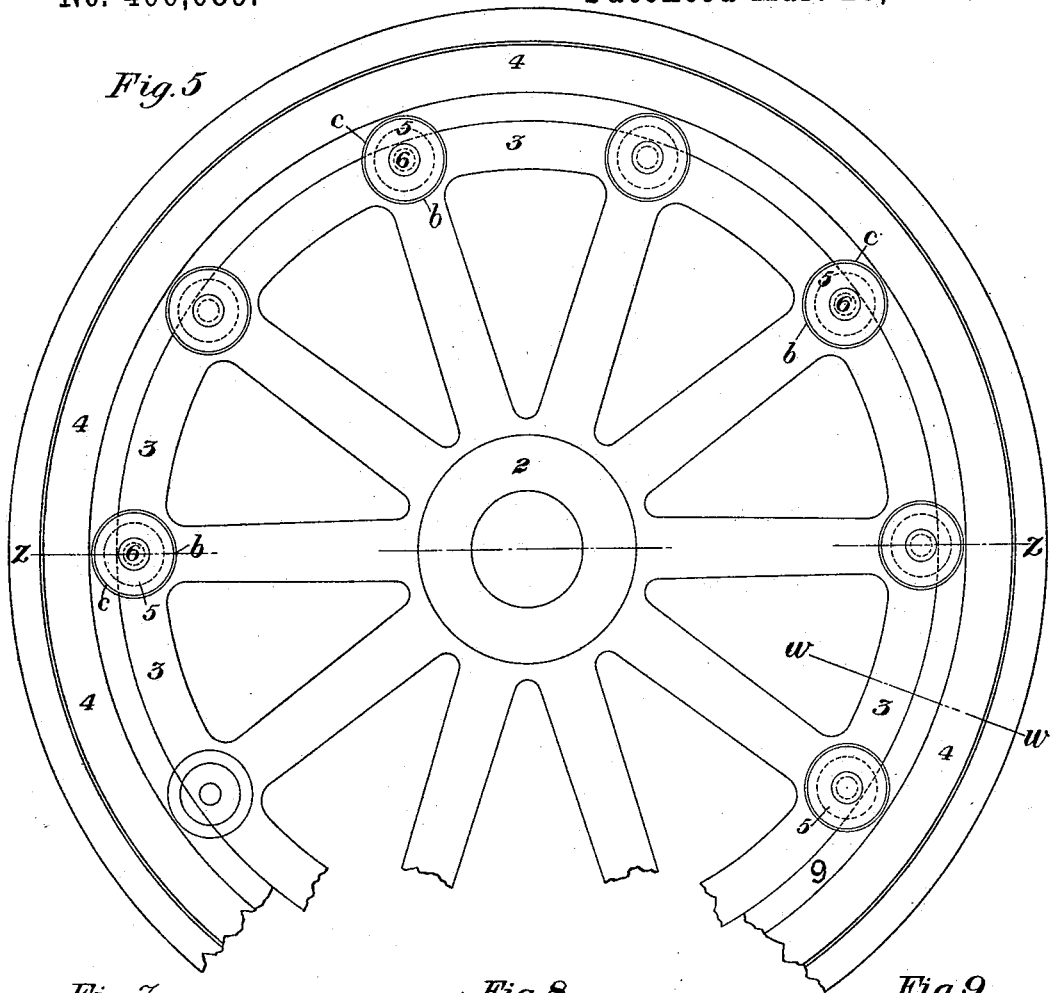
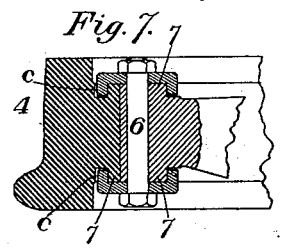
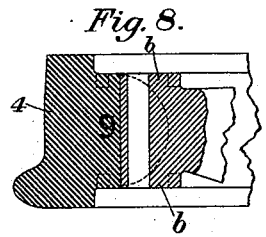
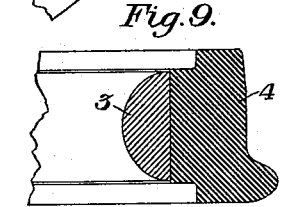
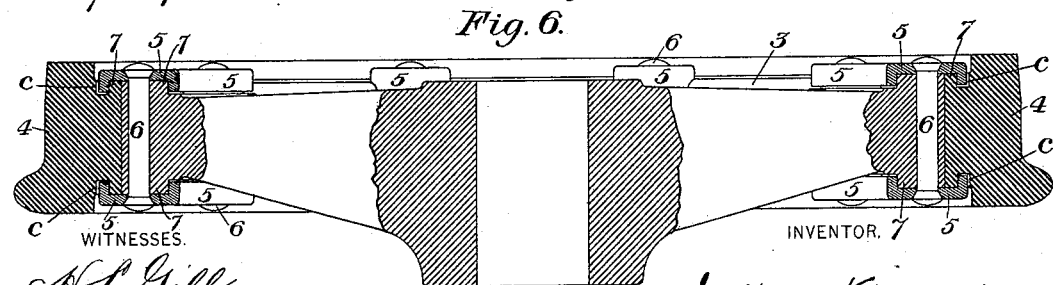
WITNESSES.
H. L. Gill.
N. B. Corwin
INVENTOR.
Julian Kennedy
by W. Bakewell & Sons
his attorneys

UNITED STATES PATENT OFFICE.

JULIAN KENNEDY, OF LATROBE, PENNSYLVANIA.

FASTENING DEVICE FOR CAR-WHEEL TIRES.

SPECIFICATION forming part of Letters Patent No. 400,089, dated March 26, 1889.

Application filed December 15, 1888. Serial No. 293,737. (No model.)

*To all whom it may concern:*

Be it known that I, JULIAN KENNEDY, of Latrobe, in the county of Westmoreland and State of Pennsylvania, have invented a new and useful Improvement in Fastening Devices for Car-Wheel Tires, of which the following is a full, clear, and exact description.

My invention relates to an improved fastening device for securing the centers of car-wheels to their tires, and it is illustrated in the accompanying two sheets of drawings, in which—

Figure 1 represents a plan view of a finished wheel. Fig. 2 is a vertical diametrical section of the wheel, the section being taken on the line $x$ $x$ of Fig. 1. Fig. 3 is a similar section of the rim of the tire, showing it shrunk on the wheel-center. This figure shows the parts as they are before the fastening device is applied to the wheel. Fig. 4 is a vertical peripheral section of the tire and of the rim of the wheel-center on the line $y$ $y$ of Fig. 1. Fig. 5 is a plan view of a finished wheel, showing a different form of tire. Fig. 6 is a diametrical section on the line $z$ $z$ of Fig. 5. Fig. 7 is a peripheral section on the line $z$ $z$ of Fig. 5. Fig. 8 is a similar section of the rim, showing the parts as they are before being prepared to receive the fastening device. Fig. 9 is a section of the periphery of the wheel on the line $w$ $w$ of Fig. 5.

The angular dotted lines in Figs. 3 and 8 indicate the manner in which the tire and wheel-center are cut to form seats for my improved fastener.

Like symbols of reference indicate like parts in each.

As shown in the drawings, the wheel-center may be of any suitable construction, having a hub, 2, a peripheral band or margin, 3, and a connecting-web or spokes.

4 is the tire of the wheel, which is formed of the usual shape, as shown in Figs. 3 and 4, and is shrunk on the wheel-center in the usual way. While the shrinking of the tire on the wheel is sufficient to connect these parts firmly together, it has been customary, in order to prevent the disconnection of the tire, which is apt to result if it is broken when in use, to tie the wheel and tire together by suitable fastening appliances. It is to an improvement in such appliances that my invention relates.

At suitable points around the wheel on both sides thereof and at the line of junction of the tire and the margin of the wheel-center, I place flanged fasteners 5, the flanges of which fit in seats made for their reception in the margin of the wheel-center and in the tire, so as to tie these parts together, and I secure the fasteners in place by means of bolts or rivets 6, which preferably extend through the margin of the wheel-center and connect the members of each pair of opposite fasteners. Preferably, for reasons explained by me hereinafter, I form these fasteners of cup-shaped pieces of metal, forged or otherwise formed into circular shape, with a vertical peripheral flange, and in order to provide a seat for the fasteners I form a peripherally-circular boss or projection, 7, partly on the tire and partly on the margin of the wheel-center, on which the cup-shaped fastener is placed, the portion of the seat on the tire (or on both the tire and wheel-center) being bounded by a circular groove cut or otherwise formed in the metal of the tire. I prefer to provide one of these seats at the end of each spoke on both sides of the wheel and to connect each pair of opposite fasteners by a rivet or bolt, which passes through the fasteners and through a hole in the margin of the wheel-center, thus binding the fasteners firmly to their seats, though, if desired, the opposite fasteners need not be so connected, or my improved fasteners may be applied to one side only of the tire, the other side being locked to or connected with the wheel-center in any other way.

I shall now describe the manner in which I form the seats for the fasteners and apply the fasteners to the wheel, from which the advantages of my invention will be made apparent to those skilled in the art.

At the ends of each of the spokes on each side of the wheel-center I form, by casting, a lateral projection, $b$, Fig. 3, which is preferably made peripherally in the form of an arc of a circle, which may be of the same or somewhat greater radius than the flange of one of the circular fasteners 5. When the tire is shrunk on the wheel-center, the parts occupy the relative positions shown in Fig. 5. Then in the line connecting the centers of the arcs of the projections b on opposite sides of the wheel I drill bolt or rivet holes, as illustrated in Fig. 3, though, if desired, these holes may be drilled before the tire is shrunk on the wheel-center, or they may be drilled after the seats for the fasteners are formed. Then I apply to the wheel a circularly-traveling cutter, whose center of motion is the axis of the bolt or rivet hole just mentioned and the radius of whose travel is the radius of the flange of one of the fasteners, the effect of the action of this cutter being to complete the seat for the fastener, forming a partially-circular groove, c, on the tire (see Fig. 2) and shaping and truing the side of the projection b to exactly the arc of the circle desired. The cutter is also so shaped as to reduce that portion of the tire which forms the seat 7 within the groove to the same level as the surface of the projection b on the wheel-center, so as to form an even and true seat for the fastener. This operation is repeated until a proper number of seats have been formed on both sides of the wheel, and then the fasteners are applied and secured by means of bolts or rivets 6, as before explained.

In Figs. 5, 6, 8, and 9 I illustrate a modified form of the method which I have described for preparing the car-wheel to receive the fasteners. Here, instead of forming the inner periphery of the tire with a plain continuous face, I form a projecting ridge, 9, the thickness of which is the same as the thickness of those parts of the wheel-center on which are the projections b. In such case it is only necessary to cut the groove in the tire without substantially cutting down the surface of the tire within the limits of the groove, as in the method described by me with reference to Figs. 2, 3, and 4.

While I am not the first to attach the wheel to the tire by mechanical appliances, the improvement which I have devised, and which consists in the use of the flanged cups or washers above described, is of great value, because the labor of forming the seats therefor can be performed quickly by suitable machine-tools, whereas in prior modes of fastening these parts together—for example, by an annular fastening-band extending entirely around the periphery of the wheel—the labor and cost of cutting the parts and of fastening them together is very considerable.

The application of my improved fastener involves comparatively little labor and cost. The cup-shaped fasteners may be easily forged or stamped in dies, and the cutting of the seats, being performed by revolving machine work, can be done very rapidly.

By the particular description which I have given of the mode of applying my improved fastening device to the wheel I do not desire to limit myself strictly thereto, since modifications in such method may be made by those skilled in the art to which my invention appertains; but

What I claim is—

1. As means for connecting wheel-tires to the centers, a series of fasteners set on opposite sides of the wheel, each of said fasteners having flanges fitted in seats on the faces of the tire and wheel-center, and having also a bolt or rivet connecting it to the wheel-center, substantially as and for the purposes described.

2. As means for connecting wheel-tires to the centers, a series of fasteners set on opposite sides of the wheel and having flanges fitted in seats on the tire and wheel-center, and bolts or rivets connecting the opposite fasteners, substantially as and for the purposes described.

3. As means for securing tires to wheel-centers, a fastener having a circular retaining-flange, which is set in a correspondingly-shaped seat on the wheel center and tire and is secured in place thereon, substantially as and for the purposes described.

4. The combination of the wheel-center having a series of lateral marginal projections, 7, a circular seat formed on the tire and wheel-center at said projections, and fasteners having circular retaining-flanges which are placed on said seats, and bolts or rivets which pass through the wheel-center and secure the opposite fasteners, substantially as and for the purposes described.

In testimony whereof I have hereunto set my hand this 11th day of December, A. D. 1888.

JULIAN KENNEDY.

Witnesses:
W. B. CORWIN,
J. K. SMITH.